United States Patent
Walker

(10) Patent No.: US 9,246,378 B2
(45) Date of Patent: Jan. 26, 2016

(54) METHOD AND APPARATUS FOR EXTENDING THE POWER OUTPUT RANGE OF A POWER CONVERTER USED FOR A LIGHTING SYSTEM

(71) Applicant: Supertex, Inc., Sunnyvale, CA (US)

(72) Inventor: James T. Walker, Palo Alto, CA (US)

( * ) Notice: Subject to any disclaimer, the term of this patent is extended or adjusted under 35 U.S.C. 154(b) by 0 days.

(21) Appl. No.: 13/946,933

(22) Filed: Jul. 19, 2013

(65) Prior Publication Data
US 2015/0022105 A1   Jan. 22, 2015

(51) Int. Cl.
| | |
|---|---|
| H05B 39/02 | (2006.01) |
| H02M 1/36 | (2007.01) |
| H05B 33/08 | (2006.01) |
| H02M 1/00 | (2007.01) |

(52) U.S. Cl.
CPC ............. *H02M 1/36* (2013.01); *H05B 33/0815* (2013.01); *H02M 2001/007* (2013.01)

(58) Field of Classification Search
CPC ............. H02M 3/33507; H02M 1/44; H02M 3/33523; H02M 1/425; H05B 37/02; H05B 39/02; H05B 33/0815; H05B 33/0845
USPC ........... 363/21.15, 21.03, 21.12, 74; 315/297, 315/307, 294, 224, 185 R
See application file for complete search history.

(56) References Cited

U.S. PATENT DOCUMENTS

| | | | | |
|---|---|---|---|---|
| 5,862,045 A * | 1/1999 | Halamik et al. | ................. | 363/97 |
| 5,920,186 A * | 7/1999 | Ninh et al. | ..................... | 323/303 |
| 8,085,563 B2 * | 12/2011 | Gaboury et al. | ................ | 363/89 |
| 8,482,219 B2 * | 7/2013 | Kuo et al. | ..................... | 315/291 |
| 8,488,338 B2 * | 7/2013 | Yang et al. | ................. | 363/21.02 |
| 8,742,693 B2 * | 6/2014 | Ikeda | ............................. | 315/307 |
| 2005/0093518 A1 * | 5/2005 | Chu et al. | ...................... | 320/166 |
| 2008/0218101 A1 * | 9/2008 | Vaziri | .................... | H05B 39/02 315/307 |
| 2009/0143032 A1 * | 6/2009 | Ojanen et al. | .............. | 455/127.1 |
| 2009/0206809 A1 * | 8/2009 | Koo et al. | ...................... | 323/282 |
| 2010/0246219 A1 * | 9/2010 | Ying | ....................... | H02M 1/44 363/74 |
| 2011/0121754 A1 * | 5/2011 | Shteynberg | ........ | H05B 33/0815 315/294 |
| 2012/0086421 A1 * | 4/2012 | Saint-Pierre | .................. | 323/283 |
| 2012/0176048 A1 * | 7/2012 | Li et al. | ......................... | 315/186 |
| 2012/0230064 A1 * | 9/2012 | Yang | ................. | H02M 3/33523 363/21.15 |
| 2012/0274298 A1 * | 11/2012 | Colbeck et al. | ................ | 323/282 |
| 2013/0021005 A1 * | 1/2013 | Saint-Pierre | ................... | 323/205 |
| 2013/0033193 A1 * | 2/2013 | Datta | ................. | H05B 33/0845 315/224 |
| 2013/0181635 A1 * | 7/2013 | Ling | ............................. | 315/297 |
| 2013/0207563 A1 * | 8/2013 | Hamamoto et al. | .......... | 315/210 |
| 2013/0278145 A1 * | 10/2013 | Lin et al. | ....................... | 315/122 |
| 2014/0009086 A1 * | 1/2014 | Saint-Pierre | .......... | H02M 1/425 315/307 |

* cited by examiner

*Primary Examiner* — Jimmy Vu
*Assistant Examiner* — Wei Chan

(57) ABSTRACT

A method and system for extending the power output range of a power converter used for a lighting system is disclosed.

23 Claims, 6 Drawing Sheets

POWER CONVERSION SYSTEM WITH CURRENT SINK

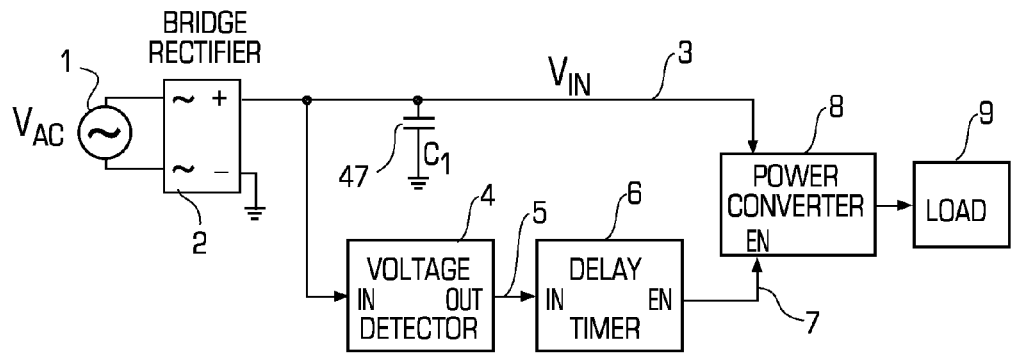
FIGURE 1:
POWER CONVERSION SYSTEM WITH DELAYED START
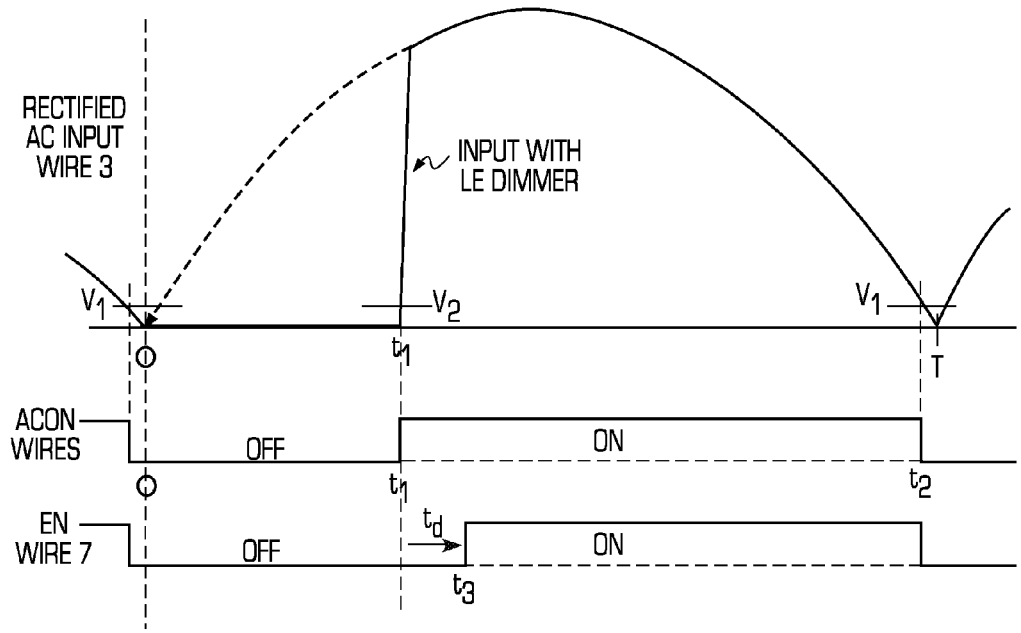
FIGURE 2: OPERATION WITH LEADING EDGE DIMMER

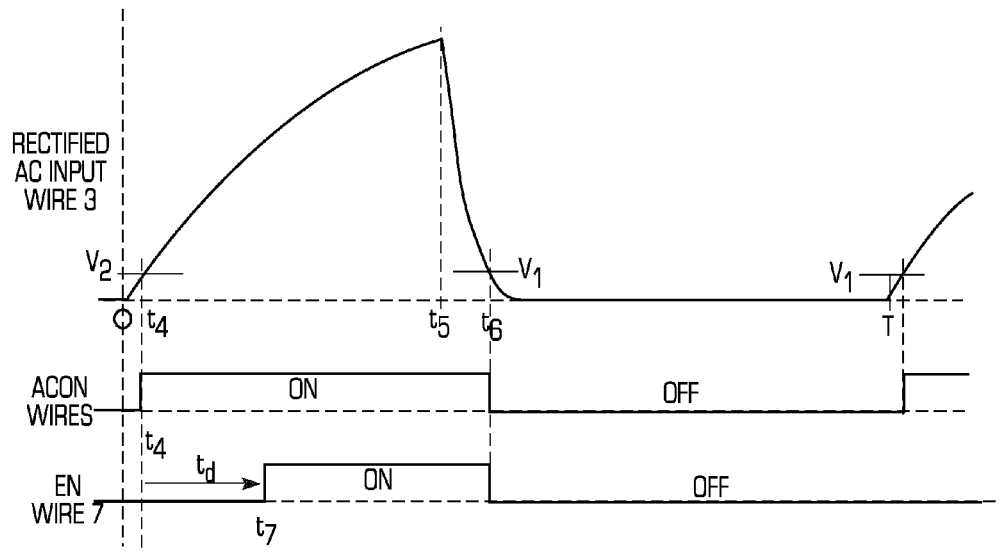
FIGURE 3: OPERATION WITH TRAILING EDGE DIMMER
$$t_d = t_3 - t_1 = K_1 t_1 - K_2, \quad K_1 t_1 \geq K_2$$
$$= 0, \quad K_1 t_1 < K_2 \qquad \text{eq (1)}$$
$$t_3 = t_1 (1 + K_1) - K_2, \quad K_1 t_1 \geq K_2$$
$$= t_1, \quad K_1 t_1 < K_2 \qquad \text{eq (2)}$$
FIGURE 4: DELAY TIMER EQUATIONS

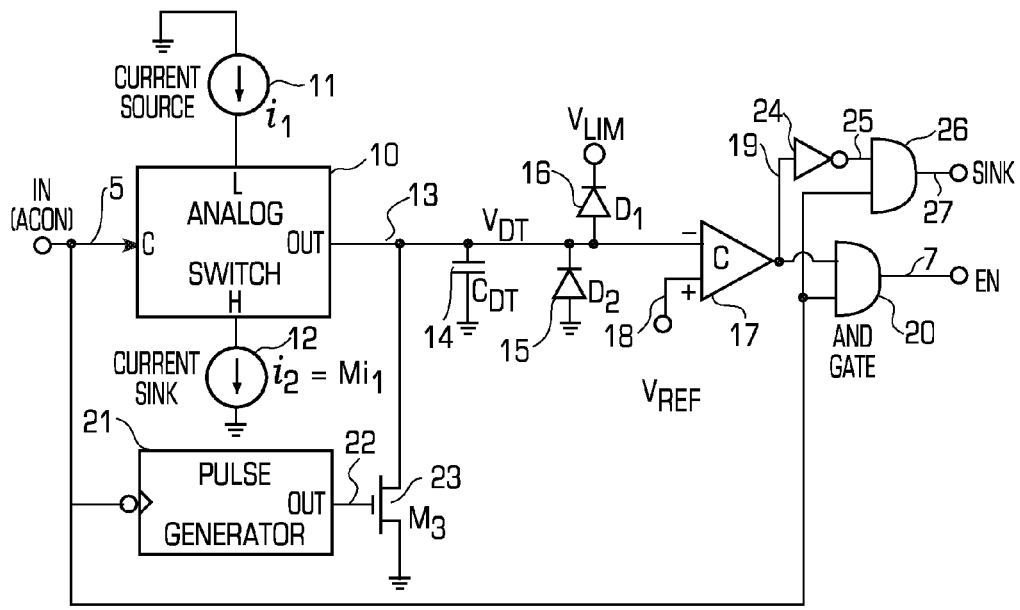
FIGURE 5: DELAY TIMER BLOCK DIAGRAM
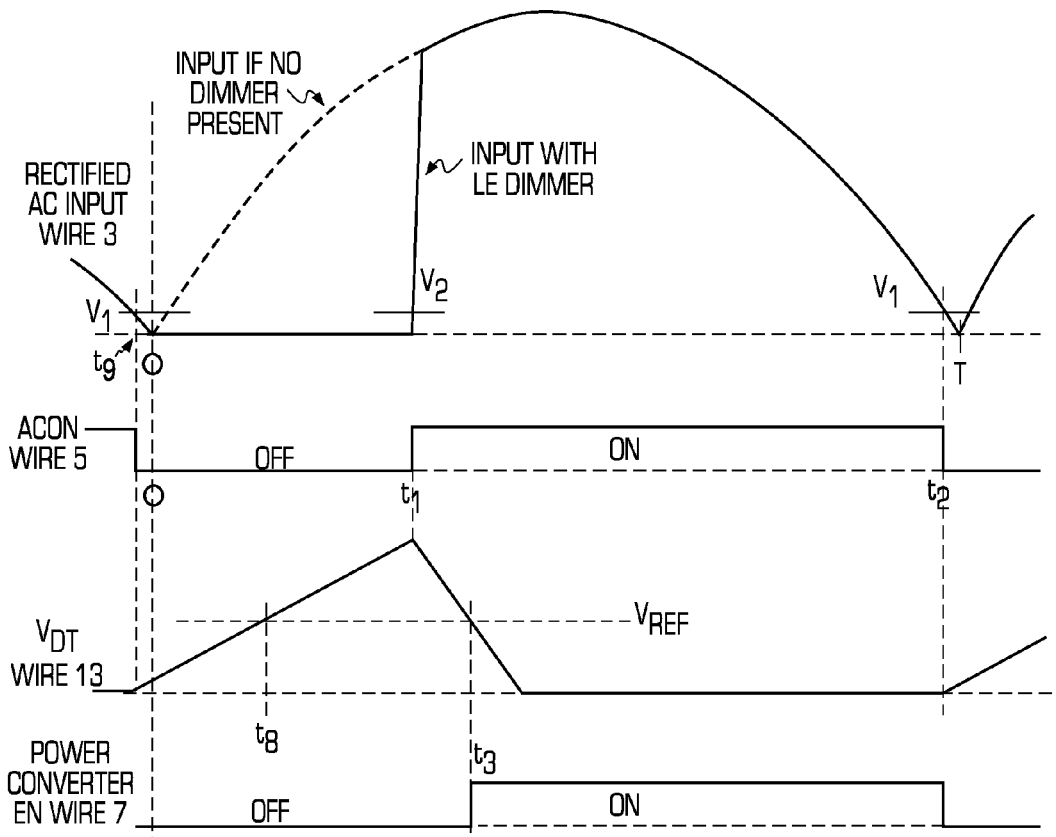
FIGURE 6: VOLTAGE WAVEFORMS IN DELAY TIMER

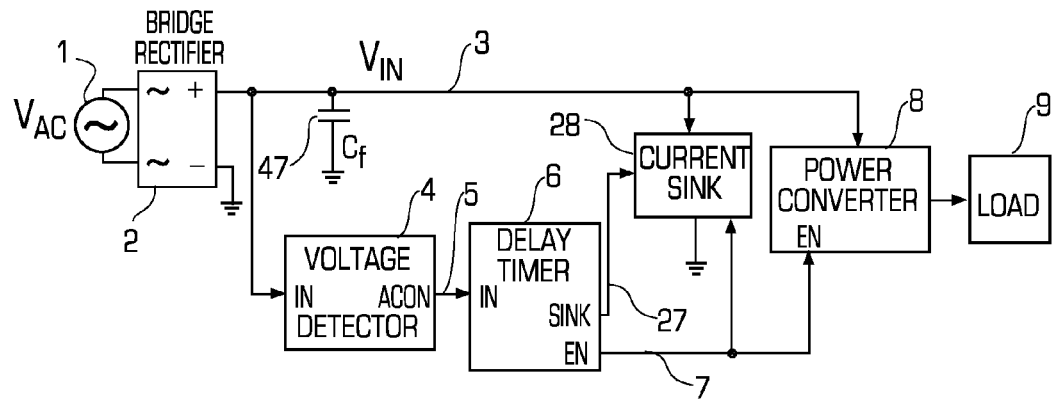
FIGURE 7:
POWER CONVERSION SYSTEM WITH CURRENT SINK
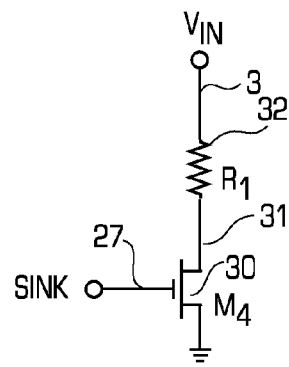
FIGURE 8: SIMPLE SINK CIRCUIT

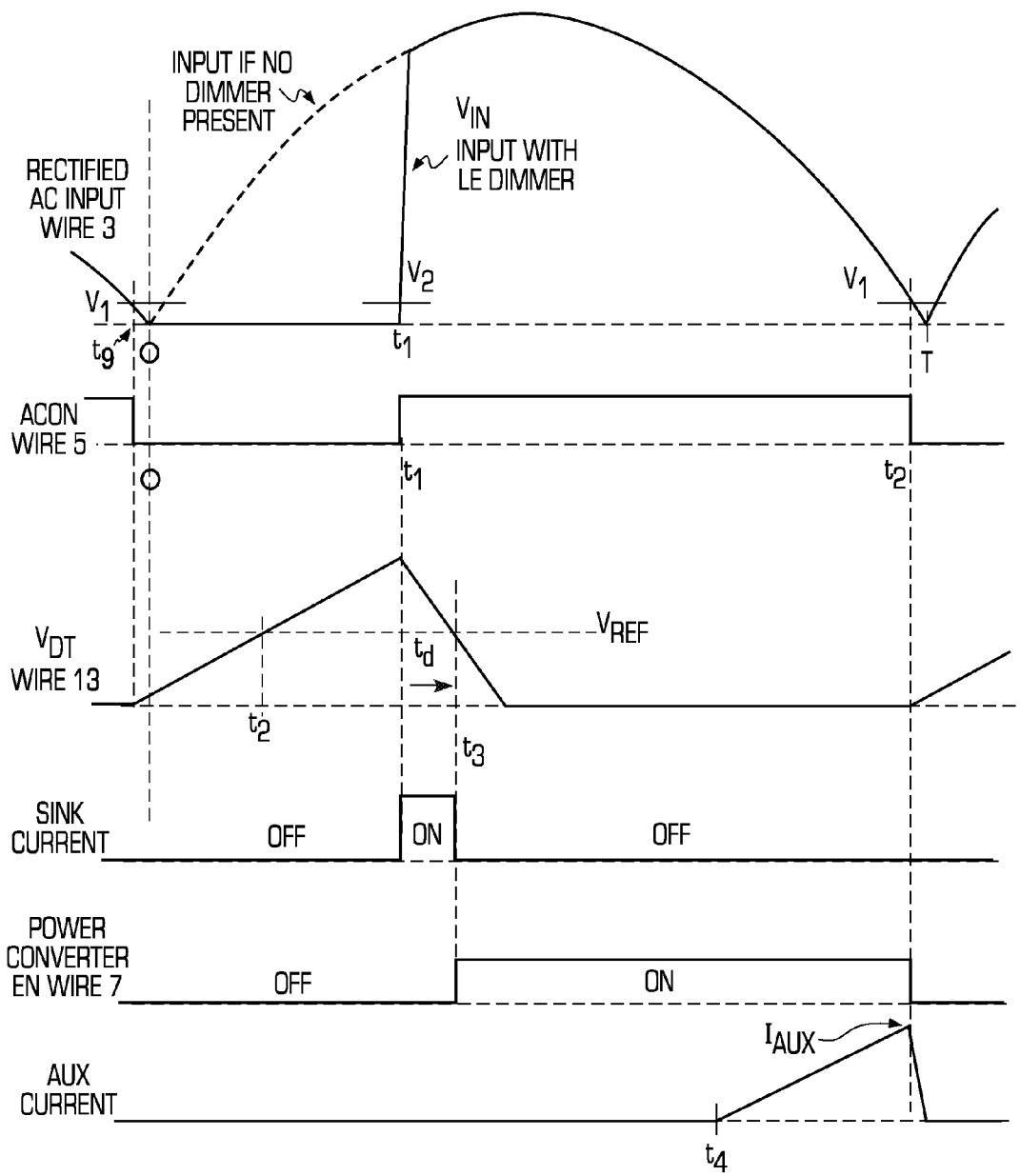
FIGURE 9: PROPORTIONAL TIME CONTROL

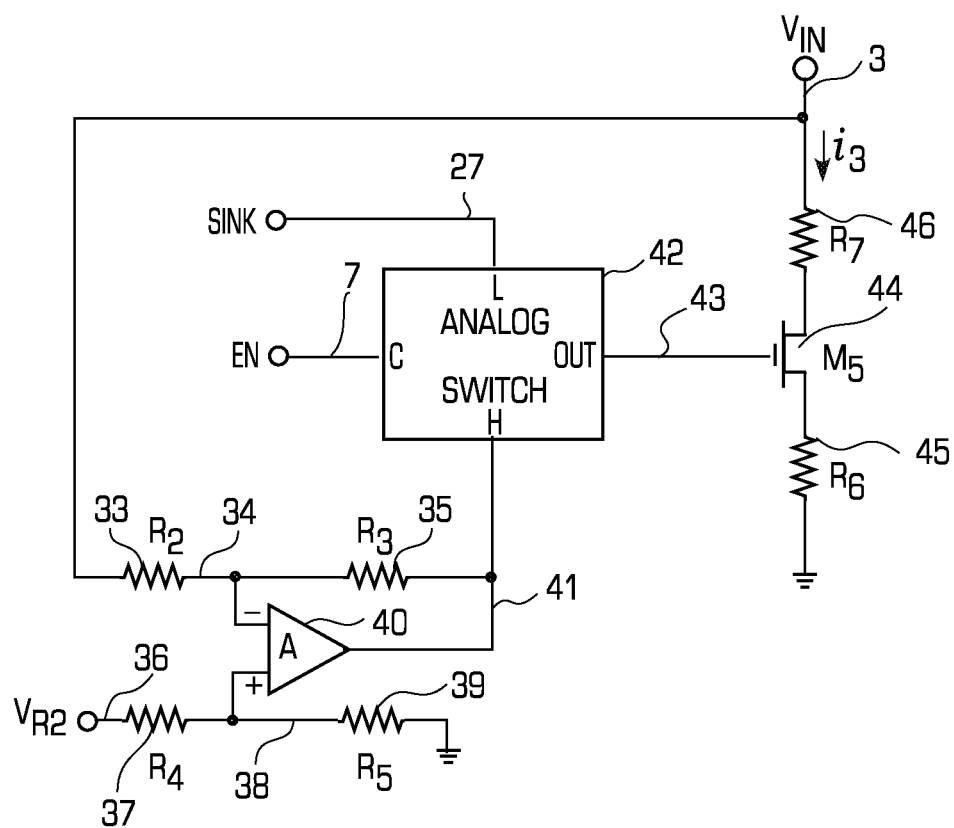
FIGURE 10: MODIFIED SINK CIRCUIT

METHOD AND APPARATUS FOR EXTENDING THE POWER OUTPUT RANGE OF A POWER CONVERTER USED FOR A LIGHTING SYSTEM

FIELD

A method and system for extending the power output range of a power converter used for a lighting system is disclosed.

BACKGROUND

A light emitting diode (LED) lighting system requires a power converter for changing the AC line voltage received from the utility power line to the DC power specific to the LED load circuit. A simple system for this purpose produces output current to the LED load whenever the incoming AC line voltage is sufficiently removed from zero. The power converter input current can be designed to represent a resistive load to the AC line input, giving a high power factor for the AC line input. In addition, the power converter input current may be sufficient to cause a phase cut lamp dimmer with either leading edge (LE) or trailing edge (TE) phase cut to operate correctly.

One difficulty with this simple means of operation is that the majority of LE and TE phase cut dimmers have a limited control range. For example, if the AC half cycle is denoted to have 180 degrees of electrical phase shift in its half period, the dimmer may typically produce an output with a minimum of 40 degrees phase delay cut, and a maximum of 140 degrees phase delay cut. The half period always has the first 40 degrees of the undimmed AC voltage missing, and always has AC power for the last 40 degrees of AC input voltage. As a result, when the dimmer is set to the maximum phase delay to give the minimum light output, there is still substantial AC power being converted to load power. Practical dimmers never have exactly the angle range or limits stated above, so these values given are exemplary of typical performance The minimum phase delay is usually in the range of 30 to 50 degrees, and the maximum phase delay is usually from 130 to 150 degrees, with some going all the way to 180 degrees.

SUMMARY OF THE INVENTION

One objective of this patent is to disclose a simple method for controlling the power converter so that its output will be reduced to zero when the associated phase cut dimmer on the AC input exceeds a chosen delay value. This method uses an auxiliary timer to measure the times that the dimmer is both not providing and is providing power, proportionally reducing the power converter operation time when large phase cut values are in use. Another objective is to show how to add a controlled current sink to the system using an auxiliary timer so that the dimmer will be provided with minimum load current at all times. The sink current produces additional loading current which when added to or used to replace the power converter input current causes the dimmer to maintain normal operation as it would with an incandescent lamp. A third objective is to show how to produce an auxiliary current so that during certain times when the power converter is running but not drawing sufficient current, the total current drawn from the dimmer will keep the phase cut dimmer operating satisfactorily.

BRIEF DESCRIPTION OF THE DRAWINGS

FIG. 1 depicts an embodiment of a power conversion system with a delayed start.

FIG. 2 depicts waveforms related to the operation of a power conversion system with a leading edge dimmer.

FIG. 3 depicts waveforms related to the operation of a power conversion system with a trailing edge dimmer FIG. 4 depicts delay timer equations for an embodiment.

FIG. 5 depicts an embodiment of a delay timer.

FIG. 6 depicts waveforms related to a delay timer.

FIG. 7 depicts an embodiment of a power conversion system with a current sink.

FIG. 8 depicts an embodiment of a sink circuit.

FIG. 9 depicts waveforms related to proportional time control of an embodiment.

FIG. 10 depicts an embodiment of a sink circuit,

DETAILED DESCRIPTION OF ONE OR MORE EMBODIMENTS

FIG. 1 shows a block diagram of a power conversion system with a delayed start time. In this system, the incoming AC line voltage Vac from source 1 is first converted to a full wave rectified voltage Vin on wire 3 by the bridge rectifier 2. Although the description here uses a full wave rectifier as known in the state of the art, a half wave rectifier or any other means of converting the incoming AC line voltage to a unipolar state could be used. The assumption here is that the power converter requires unipolar input voltage for proper operation. If that is not true, then the rectifier may be omitted or replaced with some other circuit.

The rectified input voltage Vin on wire 3 goes to a voltage detector 4, a power converter 8, and capacitor C1. Capacitor C1 denoted 47 is representative of capacitive filtering typically used to reduce electromagnetic interference (EMI) on the incoming power line. The EMI filter may be more complex than a simple capacitor as shown, but some capacitance 47 serving the purpose of C1 will always be present in any EMI filter. Use of capacitance is necessary to make a practical EMI filter with small size.

The voltage detector compares the voltage Vin on wire 3 with a reference value which may be fixed or variable as needed. This circuit may be made using any method as currently known in the state of the art. Also for purposes of rejecting noise and undesired voltages on the incoming AC power line, the voltage detector 3 may use different reference voltage levels when Vin is rising vs when Vin is falling. When the voltage Vin exceeds the predetermined reference value, it outputs a logic high on wire 5. The high voltage on wire 5 starts the delay timer 6 to measure out a time before the power converter 8 is allowed to operate. Power converter 8 may be any circuit as known in the state of the art for converting the input voltage on wire 3 to an output voltage suitable for load 9. The delay time may be a fixed value or variable depending on some other factor. For the embodiment discussed here, the delay timer produces a variable delay time, producing advantages which will be disclosed in the discussion of the circuit operation waveforms.

Output of the delay timer 6 appears on wire 7. At the chosen time after wire 5 goes high, indicating that useful voltage is available on wire 3, wire 7 goes high to tell the power converter to begin operation. Power converter 8 may be made according to any method known in the state of the art. The only requirement is that it has an enable input EN which may be connected to wire 7 so that the delay timer may control when the power converter operates. Power converter 8 takes energy from the voltage Vin on wire 3 and uses it to provide power to the load 9. Load 9 may be any device requiring power, and the typical case of interest here is a group of light emitting diodes (LED). Other devices could be used, such as an incandescent lamp, a compact fluorescent lamp (CFL), an electrolumanescent panel, or a device not yet specified. When the EN control signal is a logic low or zero volts, the power converter does not run or draw power from the input voltage source VAC denoted 1.

Although the delay timer 6 disclosed here is designed to delay the application of the EN signal to the power converter 8 at the turn-on time, and not produce significant delay at the turn-off time when the input voltage Vin on wire 3 goes away, this is not a restrictive requirement. Any means which reduces the pulse width of the EN signal on wire 7 relative to the pulse width from the voltage detector 4 on wire 5 would meet the requirements of this disclosure. It is as a matter of convenience that the delay is produced at the turn-on time, since this does not require accurate knowledge of the amount of time that the voltage Vin on wire 3 will be present. A timer which used more complex principles such as a phased lock loop or other measurement and prediction principles could be used to cause the EN signal to the power converter to turn off at a predicted time before the voltage detector output on wire 5 turns off. This type of operation, though feasible, requires more circuitry to implement than the delay timer used here. Some types of devices could implement this function with a digital means, such as a digital computation unit or miniature central processing unit (CPU).

One objective of this disclosure is to show a simple means for performing the delay timer function which achieves the leading edge delay function described above, such that when the voltage from an LE dimmer turns on with a small amount of phase delay cut, the power converter will be turned on immediately. Then when the phase delay cut is increased in value, the delay timer will smoothly increase its delay time, leading to the result that when the LE dimmer has a chosen large limit value of phase delay cut, the delay timer value will extend past the time when the input voltage Vin goes away. With this large amount of delay timer value, the power converter 8 will not operate at all, and the load 9 will not receive any power. As a result, LE dimmer phase delay values exceeding the said limit value will not produce any load power. If the load is any type of light emitting device, such as a group of LEDs, the lamp so formed will remain dark. The importance of this operation is that since LE and TE dimmers often do not vary their phase cut all the way to the end of the half cycle at 180 degrees, the said lamp may be caused to have zero light output when the dimmer is at its minimum or lowest brightness setting.

If a delay timer as described above is not used, and other means are not used to turn off the load power, a typical LE or TE dimmer will produce substantial visible light output in most type of electronic lamps. When this type of dimmer is used with an incandescent lamp, the problem of failure to completely cut off the load power is less noticed, since at low power levels, and incandescent lamp filament cools off significantly. The cooler filament emits a disproportionately smaller amount of visible light in the dimmed low power operating condition, with most energy being radiated as heat and invisible infrared radiation. Even though the observer may not see much light output, the lamp still has significant power input and heat output. The electronic type of lamp does not exhibit this radiation cooling effect, and the eye has an exponential sensitivity characteristic, so low power levels would still be highly visible.

FIG. 2 shows the voltage waveforms present in the circuit of FIG. 1 when a leading edge (LE) phase cut dimmer is used. The rectified voltage on wire 3 goes to the power converter 8 to provide load power, and to a voltage detector 4. When the voltage Vin on wire 3 exceeds a predetermined reference value, the output of the voltage detector 4 labeled ACON on wire 5 goes high. This signal is used to indicate when rectified AC input power is available for operation of the power converter 8. The ACON signal goes high at time t1 when the output of an LE dimmer turns on and Vin on wire 3 exceeds a chosen level V2. After a time delay td from t1 to t3, the timer block 6 outputs an enable signal on wire 7 to permit the power converter to run. The power converter then runs from time t3 until the AC input drops below a chosen threshold V1 at time t2.

FIG. 3 shows the corresponding set of voltage waveforms present I the circuit of FIG. 1 when a trailing edge (TE) phase cut dimmer is used. Operation of the circuit is identical to the details cited above for FIG. 2, even though the wave shape is different. The only significant difference is that the TE dimmer voltage rises more slowly when the switching threshold for V2 is crossed, and falls slowly when the dimmer turns off at time t5. The voltage fall from time t5 to t6 depends on the amount of electromagnetic frequency interference (EMI) filtering used in the dimmer circuit and the line voltage circuits of the power converter of FIG. 1. The fall time at time t5 of FIG. 2 is typically slower than the rise time at time t1 of FIG. 1, but faster than the rise time at time 0 in FIG. 2. The discharge time from t5 to t6 extends the ACON signal and increases the amount of energy available to the power converter. When the Vin voltage on wire 3 falls below the level v1, then the ACON signal on wire 5 turns off.

One simple control law for the timer is to have the time delay td proportional to the amount of time from the start of the half cycle a 0 to the time t1 when the dimmer turns on, with a constant subtracted so that td goes to zero for t1 values less than a chosen amount. Equation 1 for this type of operation is given in FIG. 4. Other control laws may be used to provide shaping of the curve for output power versus dimmer phase cut angle using more complex implementations as known in the state of the art. In FIG. 4, the time delay td is chosen to be non-zero when a first constant K1 multiplied by the time t1 is greater than a second constant K2. The constants K1 and K2 are chosen to give a pleasing dimmer control curve, usually to make the output of the power converter 8 to be zero for dimmer phase cut values exceeding a predetermined value. If the sum of td and t1 causes t3 to try to exceed 180 degrees of phase delay, then the power converter does not run at all, giving zero power to the load.

If equation 1 of FIG. 4 is solved for the time t3, this gives the equation 2 of FIG. 4. This shows more easily how the circuit works, by extending the phase cut time of the dimmer from its value of t1 to a larger value t3 in a proportionate way. K1 determines the amount of additional delay used, and K2 determines the value of t1 at which the delay extension begins to occur.

The delay timer 6 of FIG. 1 can be implemented in many ways known in the state of the art with either digital or analog methods being possible. Some of these implementations may cause the added delay to be represented by an equation or tabular function more complex than given by equation 2 of FIG. 4. This can be done to shape the dimmer control response curve in a specific application. For the disclosure here, it is sufficient to show one simple means of implementing equation 2 in delay timer 6 using an analog circuit.

Consider the analog delay timer of FIG. 5. This device uses the simple principle of charging and discharging a capacitor to produce the time values as required by equation 2 in FIG. 4. This discussion will be in relation to the block diagram previously disclosed in FIG. 1 and with previous waveforms in FIGS. 2 and 3. For clarity, the waveforms of operation with an LE dimmer have been redrawn in FIG. 6 with an additional waveform in the analog delay timer added.

When the rectified AC input voltage Vin on wire 3 falls below the level V1 the signal ACON on wire 3 goes low at time t9. The signal ACON then goes low on wire 5, starting operation of the delay timer. When wire 5 goes low, the analog switch 10 changes from connecting current sink 12 of value i2 to wire 13, to connecting the current source 11 of value i1 to wire 13. Assume that diodes D1 denoted 16 and D2 denoted 15 are ideal diodes with zero voltage drop when conducting current. This will have no substantive effect on the circuit operation, but makes the voltage levels simpler to understand.

With the analog switch 10 connecting the current sink 12 to wire 13, the current flows from capacitor Cdt denoted 14 until the voltage on wire 13 falls to zero, and then diode D2 conducts the current until ACON changes state. Now when ACON goes low as described above at time t9, the current source i1 charges the capacitor 14 and diode 15 turns off. As capacitor Cdt integrates the charge, the voltage Vdt on wire 13 moves in a positive direction as shown in the third trace of FIG. 6. This positive motion will continue until either ACON becomes high again, or the voltage on wire 13 reaches the value Vlim and diode 16 conducts the excess charge to the Vlim source.

If ACON turns on first, which is the normal mode of circuit operation, then the analog switch disconnects current source 11 and reconnects current sink 12 to wire 13 and capacitor 14. The capacitor voltage waveform then changes direction, decreasing in a negative going direction until the voltage on wire 13 reaches zero again and diode 15 turns on once more. As a result the voltage on wire 13 creates a triangular waveform, moving in a positive direction or sitting at Vlim if ACON is low, and either moving in a negative direction or sitting at zero if ACON is high.

During the course of changing value, the voltage Vdt on wire 13 is compared to a reference voltage Vref on wire 18 by a voltage comparator 17 as known in the state of the art. When Vdt is higher than Vref, the comparator output is low on wire 19, causing one input of the logical AND gate 20 to be low. As Vdt goes in a positive direction it crosses the value Vref at time t8 and continues rising. Then when ACON goes high, Vdt changes direction of motion but is still above the value Vref. The comparator output 17 on wire 19 remains low, so the AND gate 20 output EN on wire 7 also remains low, even though the other input of the gate 20 is high due to ACON being high.

After the current i2 has sufficiently discharged the capacitor Cdt 14, the voltage Vdt falls to where it crosses the reference voltage Vref in a negative going direction at time t3. At this time the comparator output switches states and wire 19 goes high. With both ACON and wire 19 high, the AND gate output EN on wire 7 is now able to go high and turn on the power converter. This action of charging and discharging capacitor 14 effectively produces a time delay from the time t1 when the ACON goes high to time t3 when the power converter is turned on. The delay produced is proportional to the amount of time that Vdt on wire 13 was above Vref and the ratio of the current source and sink values.

In FIG. 5 the ratio of the current source and sink values is M, with the equation that i2=M*i1. For a typical design, it is desirable to extend the off time of the power converter enable by 40 degrees if the dimmer phase cut is at 140 degrees, and zero if the dimmer phase cut is 40 degrees. In between these two limits, the off time extension is proportionally less. Therefore the charging time above Vref is 100 degrees, and the discharge time is 40 degrees, giving a ratio of 100/40=2.5.

This typical design therefore uses an M value of M=2.5. Other M values would be chosen for different chosen values for the dimmer angle control range.

Note that if the amount of time that signal ACON is low is sufficiently short, voltage Vdt will not rise to the level of Vref, and the comparator 17 output will remain high at all times. In this case, there is no delay added to the phase dimmer cut time when ACON is low. This produces the constant term (−K2) in the equation 2 of FIG. 4. The values of i1 and Cdt must be chosen to produce the td delay of zero for td at t1=40 degrees. This gives rise to the equation that i1=(Cdt*Vref*180)/(40*T), where T is the period of the half-cycle of AC input voltage. Then i2=M*i1 as shown in FIG. 5. This produces the value K1 of equation 2 in FIG. 4 as K1=1/M.

On the other hand, if the ACON does cross Vref, then there will be some additional time required for the capacitor 14 voltage Vdt to discharge to Vref, producing the delay time td=t3 −t1. The added time is proportional to the amount of time that Vdt exceeds Vref, and produces enough additional time delay so that when t1 is at 140 or more degrees of phase cut, the power converter will never turn on with the values previously chosen.

Operation with a TE dimmer as shown in FIG. 3 is similar, except that the additional discharge time from t5 to t6 causes the measured dimmer operation time to be extended. This requires that to obtain complete extinction of the power converter output at the minimum dimmer setting, the value of the constant terms in equation 2 of FIG. 4 must be changed. If a circuit is used which can recognize the different wave shapes of LE and TE dimmers, then this circuit can command a change of the reference voltage Vref on wire 18 for the TE dimmer case. In general the Vref value must be reduced so that K2 is smaller, resulting in the delay timer causing a greater extension of td for the TE dimmer operation. This achieves the desired result of giving complete cutoff of the power converter operation when the TE dimmer is at its minimum output setting.

Another alternative is that instead of changing the value of Vref, the TE dimmer recognition signal can command a change in the value of M for current sink 12 in FIG. 5. In an implementation using CMOS or BJT circuitry, the current sink 12 is easily implemented by a circuit known as a current mirror as used in the state of the art. Current mirrors have the property that the output current is some multiple of the input current depending on the physical structure of the transistors which are used to construct the current mirror. The reference input current to the current mirror could be a copy of the current i1, with the current mirror so constructed that its output current i2 is the multiple M times the input reference current. A simple electronic switch could then change the multiple M whenever the TE dimmer type is detected, causing the sink current to be reduced for TE dimmers. This would reduce the rate of discharge of capacitor 14 producing the voltage Vdt on wire 13, and proportionally extend the duration of the delay time td generated by the delay timer. The result is that for TE dimmers the time duration when the power converter is prevented from operation is extended, giving dimming to extinction and zero load current at the minimum output TE dimmer setting, when the phase cut is a maximum.

Any method as known in the state of the art which causes the time values of the delay timer to be altered depending on the detected type of dimmer, whether LE, TE, or some other type could be used to give complete cutoff of the power converter when the dimmer is at its minimum output setting, without altering the basic function and intent of this design.

A special operating case occurs for either LE or TE dimmers if the dimmer phase cut angle exceeds the value which causes the power converter to never turn on. In this case, the voltage Vdt charges so far in a positive direction that when ACON turns on, Vdt never discharges completely to zero before time T at the end of one half-cycle and start of another. Operation of the circuit is predicated on the capacitor 14 starting each half-cycle with zero charge on it, and the voltage on wire 13 at zero.

This problem is solved in the block diagram of FIG. 5 by providing the pulse generator 21 and discharge switch M1 denoted 23. Each time the signal ACON goes low, the pulse generator 21 puts out a pulse on wire 22 short in time compared to the half-cycle time duration T, but sufficiently long that transistor 23 is able to completely discharge capacitor 14. This time is so short that it has no material effect on the circuit operation or charging time t8. Since capacitor 14 is fully discharged at the start of each cycle, the waveform which computes the time extension td operates as described above for all values of phase dimmer cut time, which is when ACON is low. This function will work correctly for both LE and TE dimmers without adjustment.

The above discussion has shown one of many possible means for creation of the delay timer 6 in FIG. 1. Other means using both analog and digital means are possible using the state of the art without altering the material substance of this disclosure, which is to provide a circuit that extends the phase cut dimmer off time by a predetermined amount, thereby causing the power converter output to be zero for phase dimmer cut values exceeding said predetermined value.

Some types of phase cut dimmers will not function properly unless they have a certain minimum amount of load current being drawn all the time that they are outputting the AC voltage Vac. FIG. 7 shows the power converter system shown in FIG. 1 with a current sink block 28 added. The function of this block is to draw current from the Vac source when the power converter 8 is not operating and Vin is present on wire 3. The delay timer has additional logic to produce the signal Sink on wire 27 to turn on the current sink 28.

Referring again to the delay timer in FIG. 5, a logic inverter 24 as known in the state of the art is used to produce a signal on wire 25 which is high whenever the comparator 17 output on wire 19 is low. As a result, during the time td when the ACON signal is high but the comparator 17 output is low, the signal on wire 25 will be high. The AND logic gate 26 then has both inputs high during the time td, causing the Sink signal on wire 27 to be high. This in turn causes the current sink to add additional load current to wire 3, keeping the dimmer operating properly while the power converter is off.

The sink circuit can be as simple as a resistor in series with a MOSFET or other switch, or a more complicated circuit which achieves additional results. FIG. 8 shows a simple sink circuit using a MOSFET as a switch in series with a resistor. When the Sink signal 27 is high, it turns on MOSFET M4 denoted 30, connecting wire 31 to circuit ground with a low resistance. As a result, resistor R1 denoted 32 is effectively connected between Vin on wire 3 and ground. Resistor 32 is chosen to draw sufficient current from Vin to give proper operation of the phase cut dimmer when the power converter is not operating. Many other electronic switching devices as known in the state of the art such as a BJT could be used to replace M4 of FIG. 8 without altering the intent of the circuit operation. Resistor 32 could also be eliminated or additional parts added without changing the fundamental purpose of the sink circuit 28.

The current sink operation is summarized in the waveforms of FIG. 9. The rectified input sine wave Vac with the action of an LE phase cut dimmer in series produces the voltage waveform shown at the top of FIG. 9. During the time 0 to t1 in each half cycle, the LE dimmer keeps the voltage Vac at zero, and then from t1 to the half cycle period T the voltage Vac follows the sine wave power input. The voltage detector 4 of FIG. 7 outputs a logic low during the time 0 to t1, and then when the Vin on wire 3 exceeds the level V2, outputs a high voltage level from time t1 to t2. Note that to reduce problems of false triggering of the following circuits, voltage detector 4 may use different reference values V1 when the Vin on wire 3 is falling, and V2 when Vin is rising. The resultant hysteresis causes the output of the voltage detector to ignore small changes on Vin which may be caused by electrical noise or other system problems. For this to work correctly, the value of V2 must be greater than the value of V1.

The third waveform in FIG. 9 shows the voltage Vdt on wire 13 in the delay timer of FIG. 5 as discussed previously, and its relationship to the reference voltage Vref used by the comparator which defines the added time delay td. The fourth waveform then shows the sink control waveform generated on wire 27 by the delay timer of FIG. 5. This signal is high whenever the input voltage Vin on wire 3 is present, but the enable signal EN on wire 7 is low and power converter 8 is not in use. It can be appreciated therefore that current drawn by the current sink circuit 28 will cause current to be drawn from the power source Vac during the time when the power converter is not operating, thus guaranteeing that the power source and associated dimmer always has load current whenever Vin is non-zero.

An additional waveform at the bottom of FIG. 9 shows another current labeled Aux current. This represents an auxiliary current which the sink circuit 28 may be commanded to generate towards the end of each half cycle when the power converter 8 is operating. Some phase cut dimmers require a minimum amount of load current to flow at all times. Capacitor Cf denoted 47 is representative of capacitive filtering typically used to reduce electromagnetic interference (EMI) on the incoming power line. The EMI filter may be more complex than a simple capacitor as shown, but some capacitance 47 serving the purpose of Cf will always be present in any EMI filter.

Capacitor 47 of FIG. 7 sources current to the power converter during the time that Vin is falling, thereby reducing the amount of current drawn from the voltage source Vac and its dimmer circuit. The resultant total current may be insufficient for proper operation of the dimmer circuit, so an additional auxiliary load current must be created in the sink circuit. This may be done as shown in the modified sink circuit of FIG. 10.

The modified sink circuit of FIG. 10 uses a MOSFET or other semiconductor device M5 denoted 44 to serve the purpose of M4 in FIG. 8. Additional circuitry is added to allow the device 44 to produce a sink current which is proportional to a control voltage, in addition to being simply turned on and off. An analog switch 42 as known in the state of the art connects to the control electrode of device 44 using wire 43. Additional resistor R6 denoted 45 is used from one terminal of 44 to ground, so that variable voltages on wire 43 may cause variable currents to flow in device 44 in a predictable manner. Resistor 45 is not a fundamental requirement, as advantage may be taken of the inherent properties of device 44 to obtain variable control. However, use of resistor 45 permits the control voltage 43 to have a more predictable and repeatable characteristic than the device 44 could inherently provide. Thus circuit operation is more stable and predictable.

When the EN signal 7 from the delay timer 6 in FIG. 7 is low, the power converter is off. At this time, the analog switch 42 will connect its output for wire 43 to the sink control signal 27 from delay timer 6. During this time period, the circuit in FIG. 10 will functionally replicate the operation of the simple sink circuit of FIG. 8, producing a constant sink current to replace the current which would otherwise be drawn by the power converter 8 of FIG. 7.

When the EN signal 7 from the delay timer 6 in FIG. 7 is high, the power converter 8 is running. Towards the end of the half cycle near T, the dimmer may need more load current than the power converter 8 uses. During that time, the analog switch connects its output for wire 43 to the signal generated on wire 41. This signal is a variable voltage with a shape generally similar to the bottom wave shape in FIG. 9. The signal on wire 41 is obtained by using the operational amplifier 40 as known in the state of the art, in conjunction with resistors R2 denoted 33, R3 denoted 35, R4 denote 37, and R5 denoted 39. This circuit scales the input voltage Vin on wire 3 and subtracts the result from the reference voltage Vr2. While Vr2 is usually constant, it may for other purposes sometimes be changed to support operation with different dimmer types and manufactured units. The difference of Vr2 and the scaled Vin is amplified by said circuit and appears on wire 41 with a shape similar to the auxiliary current shown in FIG. 9. Due to the use of an operational amplifier the voltages on wires 34 and 38 are nominally similar, making circuit operation convenient to calculate. When the scaled difference voltage is outside the useful operating range of amplifier 40, the voltage on wire 41 will be either zero or some maximum value similar to the logic signal amplitude on the sink signal wire 27. Any other circuit as known in the state of the art which produces a wave shape similar to the result discussed above will perform the function required and described in this circuit.

The overall result is that as the Vin signal 3 approaches zero at the end of the half cycle near time T, the voltage on wire 41 increases from zero, causing device 44 to draw a proportional current. This increasing voltage 41, which usually appears as monotonically linear but is not restricted to that wave shape, causes increasing current i3 to flow through the series connection of resistors 45 and 46 and device 44. Resistor 45 aids in a linear transfer of the voltage wave shape on 41 to a similar current wave shape for i3 from wire 3. Resistor 46 is optional, and if used reduces the power dissipation capabilities required in device 44, and additionally may prevent undesired high frequency parasitic oscillations in device 44 when it is conducting current. At the end of the half cycle the current i3 increases from zero at time t4 until reaching a maximum value of Iaux right before the time t2 when the power converter turns off. When i3 is added to the power converter 8 current draw, the total is designed to be sufficient to keep a phase cut dimmer used in series with the AC power source Vac operating correctly.

This disclosure has shown how to add a proportional time delay circuit to a power converter system so that when an associated phase cut dimmer reaches it setting for minimum power output, the power converter will have zero output current to the load device. Additionally it is shown how to add a sink current generator so that at times when the phase cut dimmer device is passing voltage to the power converter but the power converter is not operating, an auxiliary current will be generated so that the phase cut dimmer will function correctly. Finally, it is shown how to add an auxiliary current sink control so that at certain times when the power converter does not draw enough current to keep the phase cut dimmer working correctly, the auxiliary current will provide additional load current so that the phase cut dimmer works satisfactorily. Although embodiments of the enabling circuits have been shown as made for the most part using analog timing techniques, any method as known in the state of the art for producing the relevant timing signals, control voltages, and sink currents could be used to implement this method of power converter control.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A power conversion system with a delayed start time, comprising:
    a voltage detector for receiving a rectified voltage; and
    comparing a reference voltage and the rectified voltage to generate an output signal when the rectified voltage exceeds the reference voltage;
    a delay timer configured to: receive the output signal and generate a sink signal and an enable signal;
    a power converter enabled by the enable output signal; and
    a current sink circuit comprising a transistor for drawing a sink current from a source of the rectified voltage and an analog switch comprising a switch output coupled to the gate of the transistor and inputs configured to receive the sink signal, the enable signal and a voltage signal;
    wherein the analog switch connects the switch output to a constant current when the power converter is not enabled and connects the switch output to a variable voltage circuit when the power converter is enabled.

2. The system of claim 1, further comprising:
    a rectifier circuit for receiving an alternating current (AC) input and producing a direct current (DC) output and providing the DC output as the rectified voltage to the voltage detector.

3. The system of claim 1 wherein the power converter is enabled by the delay timer when a first time interval has elapsed after the delay timer is triggered.

4. The system of claim 3, wherein the delay timer comprises a capacitor and the first time interval is generated by a charging and discharging of the capacitor.

5. The system of claim 4, wherein the delay timer further comprises a switch that couples the capacitor to a current source in a first position and couples the capacitor to a current sink in a second position.

6. The system of claim 5, wherein the capacitor is charged during the time that the voltage detector output is off due to AC input not being present, and said capacitor is discharged during the time that said voltage detector output is on due to AC input being present.

7. The system of claim 6, wherein the capacitor charge and discharge currents have different values.

8. The system of claim 6, wherein the power converter is not operated until said capacitor discharges to a predetermined voltage.

9. The system of claim 3 wherein the current sink circuit contains at least one MOSFET.

10. The system of claim 3
    wherein the amount of current drawn by the current sink circuit is proportional to a control voltage.

11. A dimmer for use with a lighting system, comprising:
    a rectifier circuit for receiving an alternating current (AC) input and producing a direct current (DC) output;
    a voltage detector for generating an output signal when the DC output exceeds a threshold voltage;
    a delay timer configured to: receive the output signal and generate a sink signal and an enable signal;
    a power converter enabled by the enable signal; and a current sink circuit comprising a transistor for drawing a sink current from a source of the rectified voltage and an analog switch comprising a switch output coupled to the gate of the transistor and inputs configured to receive the sink signal, the enable signal and a voltage signal;

wherein the analog switch connects the switch output to a constant current when the power converter is not enabled and connects the switch output to a variable voltage circuit when the power converter is enabled.

12. The system of claim 11, wherein the power converter is enabled by the delay timer when a first time interval has elapsed after the delay timer is triggered.

13. The system of claim 12, wherein the delay timer comprises a capacitor and the first time interval is generated by a charging and discharging of the capacitor.

14. The system of claim 13, wherein the delay timer further comprises a switch that couples the capacitor to a current source in a first position and couples the capacitor to a current sink in a second position.

15. The system of claim 14, wherein the capacitor is charged during the time that the voltage detector output is off due to AC input not being present, and said capacitor is discharged during the time that said voltage detector output is on due to AC input being present.

16. The system of claim 15, wherein the capacitor charge and discharge currents have different values.

17. The system of claim 15, wherein the power converter is not operated until said capacitor discharges to a predetermined voltage.

18. The system of claim 14 wherein the current sink circuit contains at least one MOSFET.

19. The system of claim 14 wherein the amount of current drawn by the current sink circuit is proportional to a control voltage.

20. A method of dimming a lighting system, comprising:
receiving, by a rectifier circuit, an alternating current (AC) input and producing a direct current (DC) output;
generating, by a voltage detector, a signal indicating that the DC output exceeds a threshold voltage;
measuring, by a delay timer, a first time interval that is initiated by the signal;
generating, by the delay timer, a sink signal and an enable signal;
enabling a power converter based on the enable signal;
providing, by the power converter, a voltage to a load; and
drawing current, by a current sink circuit, from the DC output of the rectifier circuit in response to a voltage signal, the sink signal, and the enable signal when the power converter is not enabled.

21. The method of claim 20, wherein the load comprises a light emitting diode (LED) system.

22. The method of claim 20 further comprising a timer system for reducing the power converter operation time in proportion to the dimmer phase angle information.

23. The method of claim 20, wherein the load comprises at least one of the following: an incandescent lamp, a compact fluorescent lamp (CFL), or an electrolumanescent panel.

* * * * *